United States Patent [19]

Ida et al.

[11] Patent Number: 5,677,585
[45] Date of Patent: Oct. 14, 1997

[54] MOTOR

[75] Inventors: Mitsuru Ida, Saitama; Hiroshi Murata, Chiba; Shinjiro Akiha, Saitama, all of Japan

[73] Assignee: Sony Corporation, Japan

[21] Appl. No.: 588,239

[22] Filed: Jan. 18, 1996

[30] Foreign Application Priority Data

Jan. 31, 1995 [JP] Japan .................. 7-014464
Mar. 29, 1995 [JP] Japan .................. 7-071870

[51] Int. Cl.⁶ .................. H02K 5/16; H02K 5/167
[52] U.S. Cl. .................. 310/91; 310/90
[58] Field of Search .................. 310/90, 91, 266, 310/268; 384/240, 243, 244, 245, 246, 420, 425

[56] References Cited

U.S. PATENT DOCUMENTS

| | | | |
|---|---|---|---|
| 3,189,770 | 6/1965 | Baudot | 310/156 |
| 4,283,644 | 8/1981 | Kondo et al. | 310/268 |
| 4,363,984 | 12/1982 | Torii et al. | 310/90 |
| 4,429,245 | 1/1984 | Muller et al. | 310/266 |
| 4,612,468 | 9/1986 | Sturm et al. | 310/90 |
| 4,737,673 | 4/1988 | Wrobel | 310/90 |
| 4,955,791 | 9/1990 | Wrobel | 310/90 |
| 4,968,910 | 11/1990 | Meier et al. | 310/90 |
| 4,987,333 | 1/1991 | Noguchi et al. | 310/268 |
| 5,289,069 | 2/1994 | Hasegawa et al. | 310/268 |
| 5,347,187 | 9/1994 | Tsuzaki et al. | 310/40 MM |
| 5,561,335 | 10/1996 | Dunfield et al. | 310/90 |

*Primary Examiner*—Clayton E. LaBalle
*Attorney, Agent, or Firm*—Ronald P. Kananen

[57] ABSTRACT

A motor includes a bearing portion, a chassis, a thrust pad and a plurality of supporting members. The bearing portion is formed of a sintered oilless bearing or the like and supports a rotary shaft of the bearing portion. The chassis has a stator attached thereto and has a cylindrical holding portion for retaining therein the bearing portion integrally formed therewith. The thrust pad is disposed within the holding portion and pivotally supports the rotary shaft in the thrust direction. The supporting members are disposed on the bottom surface portion of the holding portion and support the thrust pad.

14 Claims, 5 Drawing Sheets

MOTOR

BACKGROUND

1. Field of the Invention

The present invention relates to a motor, and more particularly to a motor having a bearing supporting portion integrally formed with a motor chassis.

2. Background of the Invention

Figure 1:
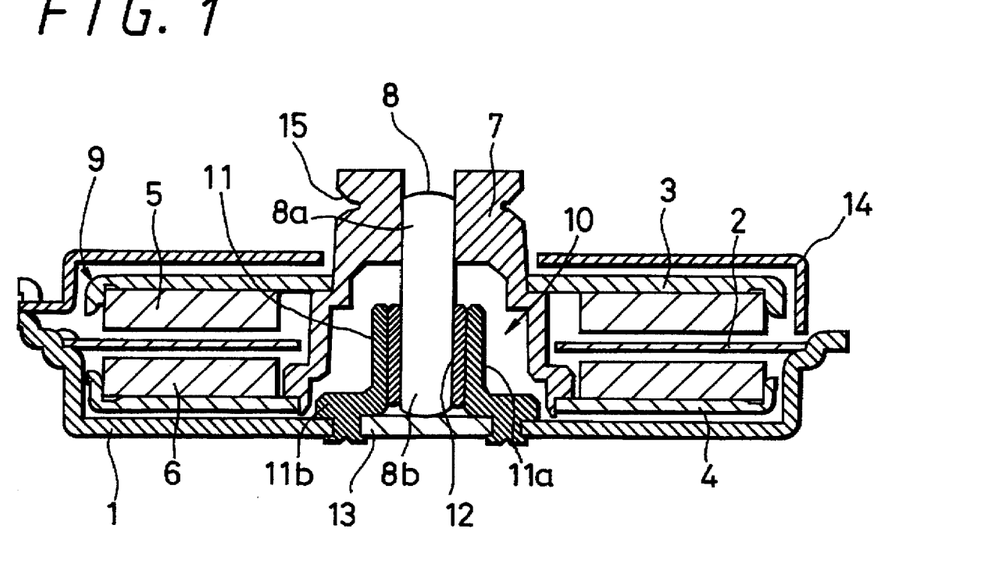
FIG. 1 is a cross-sectional view illustrative of a flat brushless motor.

FIG. 1 of the accompanying drawings shows in cross-sectional form a flat brushless motor.

As shown in FIG. 1, a flat brushless motor comprises a motor chassis 1, a stator base 2 with a printed coil formed thereon as a stator coil fixed to the motor chassis 1, rotor magnets 5, 6 disposed on both surfaces of the stator base 2 with predetermined gaps and yokes 3, 4 with the rotor magnets 5, 6 attached thereto. The yokes 3, 4 are fixed at their center portions to a boss 7. An upper end 8a of a rotor shaft 8 is force fitted into the boss 7.

The motor chassis 1 is provided with a bearing supporting mechanism 10 for pivotally supporting the rotor shaft 8. A lower end 8b of the rotor shaft 8 is inserted into the bearing supporting mechanism 10 and the stator base 2 is engaged with the peripheral edge of the motor chassis 1. As a consequence, alternating magnetic fields generated from the printed coil of the stator base 2 and vertical magnetic flux generated from the rotor magnets 5, 6 are interlinked with each other to rotate the rotor magnets 5, 6 in unison with the yokes 3, 4.

In the flat brushless motor shown in FIG. 1, the bearing supporting mechanism 10 comprises a cylindrical bearing cage 11 with a flange 11b formed on its base end made of a metal such as brass, a sintered oilless bearing 12 fitted into a cylindrical portion 11a of the bearing cage 11 with a pressure, and a thrust pad 13 made of a wear-resisting resin such as nylon fixed to the outer end surface of the flange 11b of the bearing cage 11 by caulking. The bearing cage 11 of the bearing supporting mechanism 10 is secured to the center portion of the motor chassis 1 by caulking. Then, the lower end portion 8b of the rotor shaft 8 is fitted into the sintered oilless bearing 12 and the lower end surface of the rotor shaft 8 is brought in contact with the thrust pad 13, thereby the rotor shaft 8 being pivotally supported.

In the flat brushless motor shown in FIG. 1, the motor chassis 1 is open on its upper surface and a motor cover 14 is attached to the motor chassis 1 at its upper open portion in order to protect the rotor 9 from being damaged. A pulley 15 is integrally formed with the circumferential surface of the upper end of the boss 7.

In the flat brushless motor 1 shown in FIG. 1, with the bearing supporting mechanism 10 of the rotor shaft 8, the sintered oilless bearing 12 is fitted into the cylindrical bearing cage 11 made of a metal such as brass different from that of the motor chassis 1. The thrust pad 13 is fixed to the bearing cage 11 by caulking. However, if the sintered oilless bearing 12 of the bearing supporting mechanism 10 intends to maintain a sufficient amount of oil, a sintering density is lowered and a mechanical strength of the sintered oilless bearing 12 against an impact load is lowered because the volume of the sintered oilless bearing 12 itself is small as shown in FIG. 1. Therefore, such sintered oilless bearing should be fitted into a bearing cage with a mechanical sufficient strength and thereby joined to the motor chassis.

For this reason, the bearing cage which is independently formed from the motor chassis 1 should have a sufficient mechanical strength and a high dimension accuracy. Further, the bearing cage should be fixed to the motor chassis at the correct position by caulking. As a result, the bearing cage itself becomes expensive. In addition, the thrust pad should be fixed to the bearing cage by caulking and the bearing cage also should be fixed to the motor chassis by caulking. Due to such caulking, the motor cannot be made inexpensively.

SUMMARY OF THE INVENTION

It is therefore an object of the present invention to provide a motor in which the above-mentioned problems can be solved.

According to the present invention, there is provided a motor which includes a bearing portion, a chassis, a thrust pad and a plurality of supporting members. The bearing portion supports a rotary shaft of a rotor. A holding portion for retaining therein the bearing portion is integrally formed with the chassis. The thrust pad is disposed within the holding portion to pivotally support the rotary shaft in the thrust direction. The supporting members support the thrust pad provided on the bottom portion of the holding portion.

According to the present invention, there is provided a motor which includes a bearing portion, a chassis and a magnet. The bearing portion supports a rotary shaft of a rotor. A holding portion for retaining therein the bearing portion is integrally formed with the chassis. The magnet is attached to the rotor to directly apply an attraction between it and the chassis.

DESCRIPTION OF THE INVENTION

A motor according to the embodiments of the present invention will be described below with reference to the drawings. In the embodiments below, a motor is a flat brushless motor.

Figure 2:
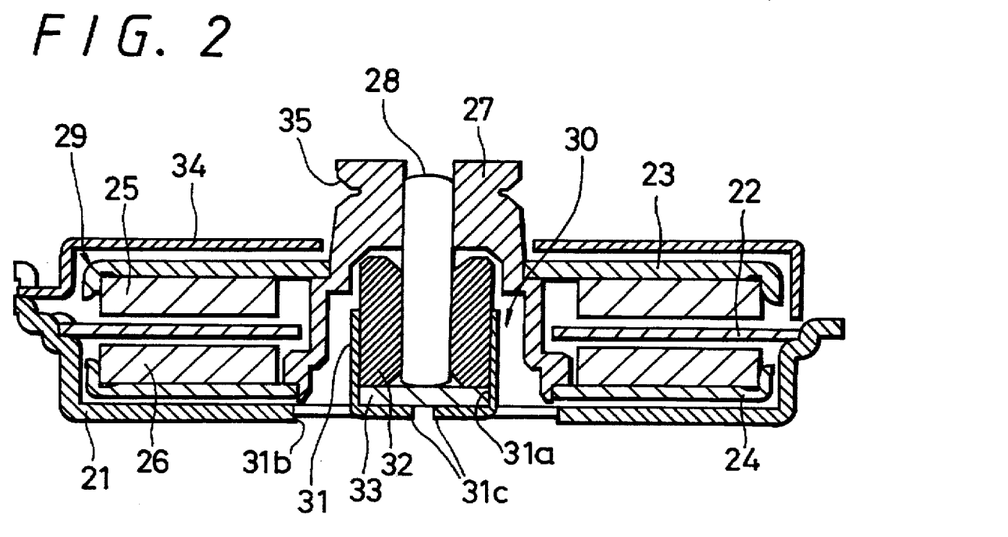
FIG. 2 is a cross-sectional view illustrative of a flat brushless motor according to a first embodiment of the present invention.

A flat brushless motor according to a first embodiment of the present invention will be described with reference to FIGS. 2 and 3.

As illustrated, a flat brushless motor according to the first embodiment includes a stator and a rotor. The stator includes a stator base 22 with a printed coil formed thereon as a stator coil attached to a motor chassis 21. A rotor 29 comprises rotor magnets 25, 26 formed on the upper and lower surfaces of the stator base 22 so as to sandwich the stator base 22 with a predetermined gap between them and the stator base 22, yokes 23, 24 with the rotor magnets 25, 26 attached thereto and a boss 27 with the yokes 23, 24 attached thereto. As shown in FIG. 2, the boss 27 is fitted into the upper end of the rotor shaft 28 with a pressure and attached to the rotor shaft 28. The boss 27 has on its outer peripheral portion of the upper end formed a groove with which a pulley 35 is formed integrally. A lower end of the boss 27 is larger than the upper end in diameter. The yoke 24 is attached to the lower end of the boss 27. The yoke 23 is attached to the boss 27 at its position above the intermediate portion in parallel to the yoke 24. The stator base 22 and the rotor magnets 25, 26 are spaced apart by gaps with predetermined widths.

Figure 3:
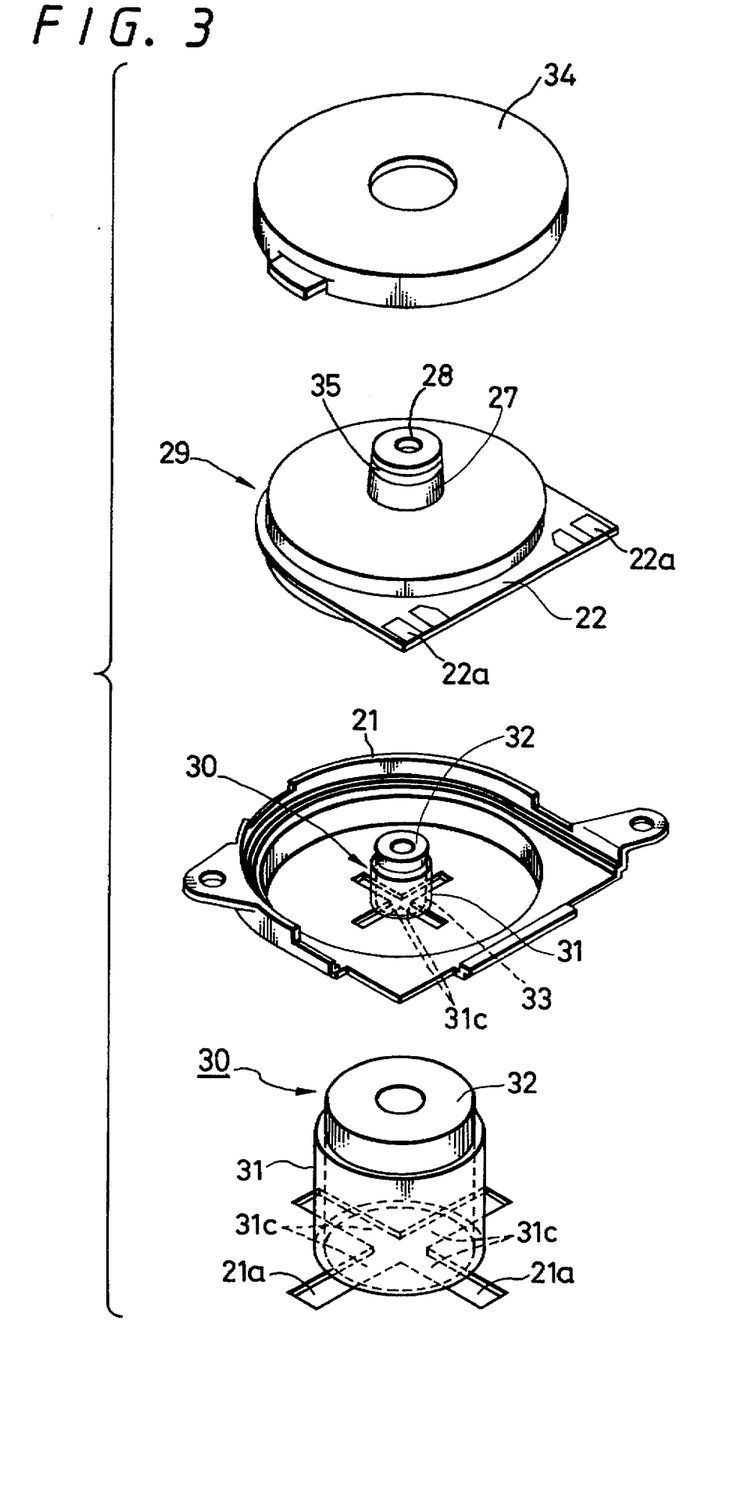
FIG. 3 is an exploded perspective view illustrative of the flat brushless motor according to the first embodiment of the present invention.

As shown in FIG. 3, the stator base 22 includes terminal portions 22a with patterns formed thereon projected from the rotor 29 for supplying a voltage to the printed coil formed on the stator base 22.

In the first embodiment, a bearing supporting mechanism 30 of the rotor 29 is integrally formed with the motor chassis 21. Specifically, the cylindrical bearing cage 31 is integrally formed on the bottom center portion of the metal motor chassis 21 by deep drawing (burring). When the bearing supporting mechanism 30 is integrally formed with the motor chassis 21 by deep drawing, a cylindrical bore 31a is defined on the lower end of the lower surface of the bottom of the motor chassis 21 as a base end opening of the bearing cage 31. An outer peripheral surface portion that surrounds the cylindrical bore 31a is formed as a concave surface portion 31b.

On the portion that surrounds the bearing cage 31, i.e., on the concave surface portion 31b are formed a plurality of slip-like supporting members 31c from the base end peripheral edge of the bearing cage 31, i.e., the peripheral edge of the rising portion of the bottom of the motor chassis 21 to the radial direction. The slip-like supporting members 31c can be folded toward the inside of the cylindrical bore 31a defined in the lower end of the bearing cage 31. That is, the slip-like supporting members 31c are radially folded about the bearing cage 31 to the bottom surface of the motor chassis 21 and bent toward the inside of the bearing cage 31, whereby the supporting members 31c are formed so as to cover the cylindrical bore 31a defined in the lower end of the bearing cage 31 as shown in FIG. 2.

As shown in FIG. 3, a plurality of rectangular perforations 21a are radially extended from the bearing cage 31a of the motor chassis 21 after the supporting members 31c have been formed as described above.

A sintered oilless bearing 32 is fitted with a pressure into the upper opening portion of the bearing cage 31 integrally formed with the motor chassis 21 by deep drawing. A thrust pad 33 made of a wear-resisting material such as nylon is engaged with the lower end surface of the sintered oilless bearing 32 from the cylindrical bore 31a defined in the lower end of the bearing cage 31. Simultaneously, the thrust pad 33 is brought in contact with the lower end of the rotor shaft 28. In this state, the supporting members 31c are folded and bent toward the cylindrical bore 31a defined in the lower end of the bearing cage 31 to hold the thrust pad 33, thereby the bearing supporting mechanism 30 being formed.

The lower end of the rotor shaft 28 is fitted into the sintered oilless bearing 32 of the bearing supporting mechanism 30. The rotor shaft 28 contacts at its tip end portion of the lower end side with the thrust pad 33 as shown in FIG. 2. The boss 27 is attached to the upper end of the rotor shaft 28 with a pressure. Consequently, the rotor shaft 28 is pivotally supported to the motor chassis 21. In other words, the rotor 29 is attached to the stator base 22 attached to the motor chassis 21 so as to become freely rotatable.

In this state, a motor cover 34 is attached to the motor chassis 21 in such a manner that the cover 34 covers the upper open portion of the motor chassis 21, i.e., the upper surface of the rotor 29. The terminal portions 22a are projected from the body of the rotor 29 and exposed from the motor cover 34 such that they can be electrically connected to feeders or signal lines (not shown) by a suitable method such as soldering.

In the flat brushless motor according to the first embodiment, the bearing cage 31 wherein the sintered oilless bearing 32 is fixed to the motor chassis 21 by holding the sintered oilless bearing 32 with the rotor shaft 28 pivotally supported thereto is integrally formed with the motor chassis 21 by deep drawing. The supporting members 31c for holding the thrust pad 33 that is engaged with the cylindrical bore 31a defined in the lower end of the bearing cage 31 are folded on the concave surface portion 31b. Consequently, costs for parts of the supporting members of the bearing cage 31 and the thrust pad 33 and machining costs can be reduced. Also, the bearing cage need not be fixed to the motor chassis by caulking or the like. Moreover, since the thrust pad 33 can be held by folding and bending the slip-like supporting members 31c toward the cylindrical bore 31a defined in the lower end of the bearing cage 31, the thrust pad 33 need not be fixed to the bearing cage 31 by caulking or the like. Therefore, the flat brushless motor according to this embodiment becomes inexpensive. Furthermore, since the bearing cage 31 is integrally formed with the motor chassis 21, the bearing cage 31 can be formed at the correct position with a high accuracy of dimension. Thus, the rotor shaft 28 can be pivotally supported within the bearing cage 31 and can therefore be rotated stably.

A flat brushless motor according to a second embodiment of the present invention will be described below with reference to FIG. 4.

Figure 4:
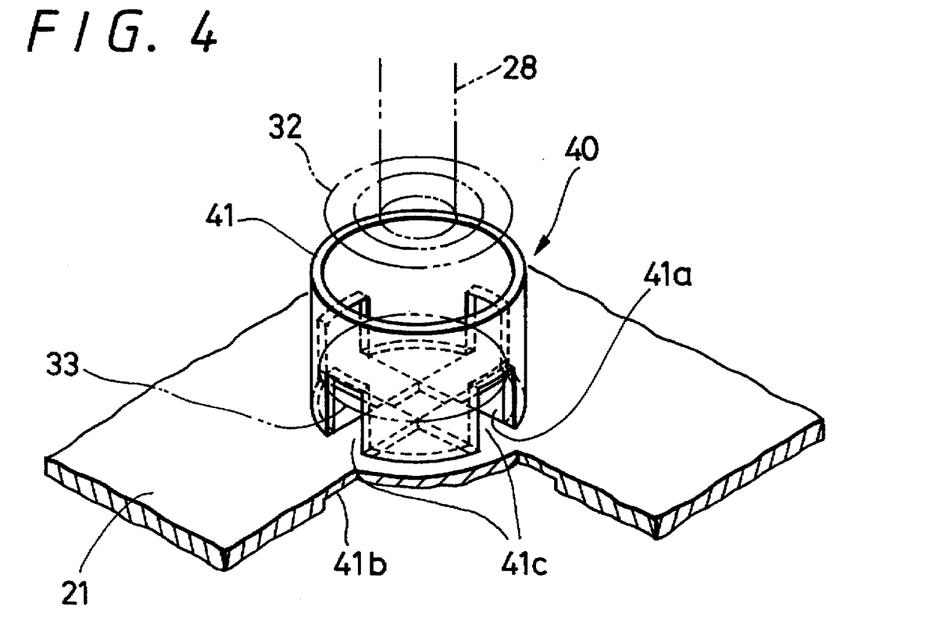
FIG. 4 is a perspective view illustrative of a bearing mechanism of a flat brushless motor according to a second embodiment of the present invention.

FIG. 4 illustrates only a bearing mechanism of flat brushless motor according to a second embodiment of the present invention. A rest of the arrangement of the flat brushless motor according to the second embodiment is formed similarly to that of the first embodiment.

As shown in FIG. 4, a cylindrical bearing supporting mechanism 40 of the flat brushless motor according to the second embodiment includes a bearing cage 41 which fixedly holds the sintered oilless bearing 32. The cylindrical bearing cage 41 is integrally formed with the motor chassis 21 by deep drawing similarly to the first embodiment shown in FIGS. 2 and 3. A plurality of supporting members 41c for supporting the thrust pad 33 fitted into a cylindrical bore 41a defined in the lower end of the bearing cage 41 are raised on the peripheral surface of the bearing cage 41 from the base end to the circumferential direction toward the shaft direction at a predetermined spacing. The supporting members 41c are bent toward the cylindrical opening 41a defined in the lower end of the bearing cage 41, i.e., bent toward the direction perpendicular to the shaft direction so as to close the opening end of the cylindrical bore 41a. In this state, after the thrust pad 33 has been fitted from the upper opening end of the bearing cage 41 and supported by the supporting members 41c, the sintered oilless bearing 32 is fitted into the bearing cage 41 with a pressure, thereby the bearing supporting mechanism 40 for pivotally supporting the rotor shaft 28 being formed. In FIG. 4, reference numeral 41b depicts a thin concave surface portion formed when the bearing cage 41 is integrally formed with the motor chassis 21 by deep drawing.

In the bearing supporting mechanism 40 according to the second embodiment of the present invention, perforations left opened to the circumferential surface of the bearing cage 41 after the supporting members 41c for supporting the thrust pad 33 have been raised can be closed by the circumferential surfaces of the sintered oilless bearing 32 and the thrust pad 33 so that the inside of the motor chassis 21 can be prevented from being smudged by dusts or the like.

Figure 5:
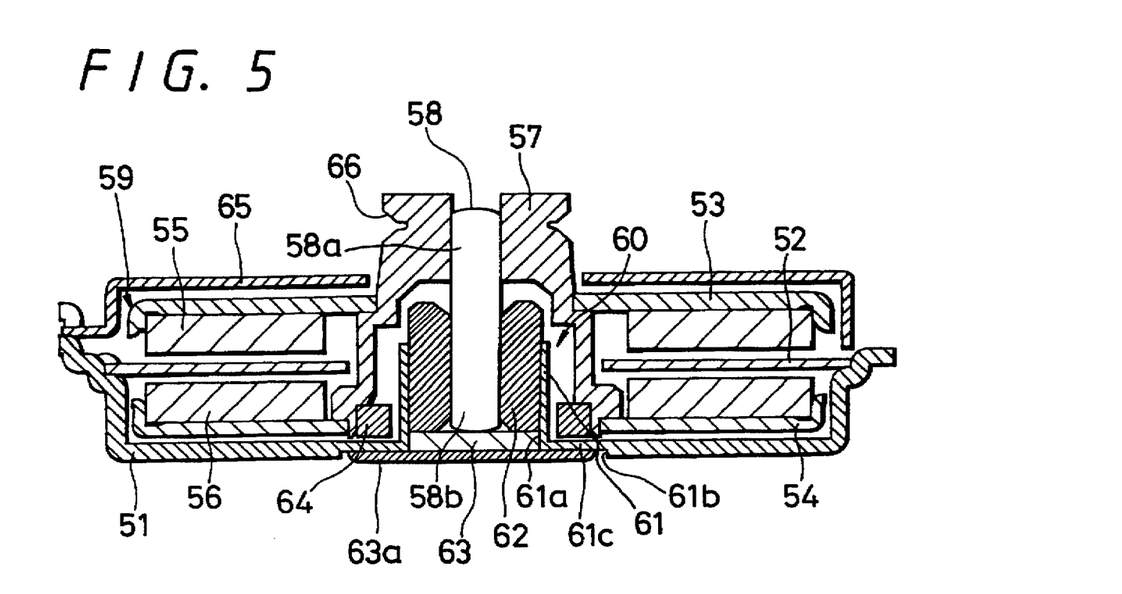
FIG. 5 is a cross-sectional view illustrative of a flat brushless motor according to a third embodiment of the present invention.
Figure 6:
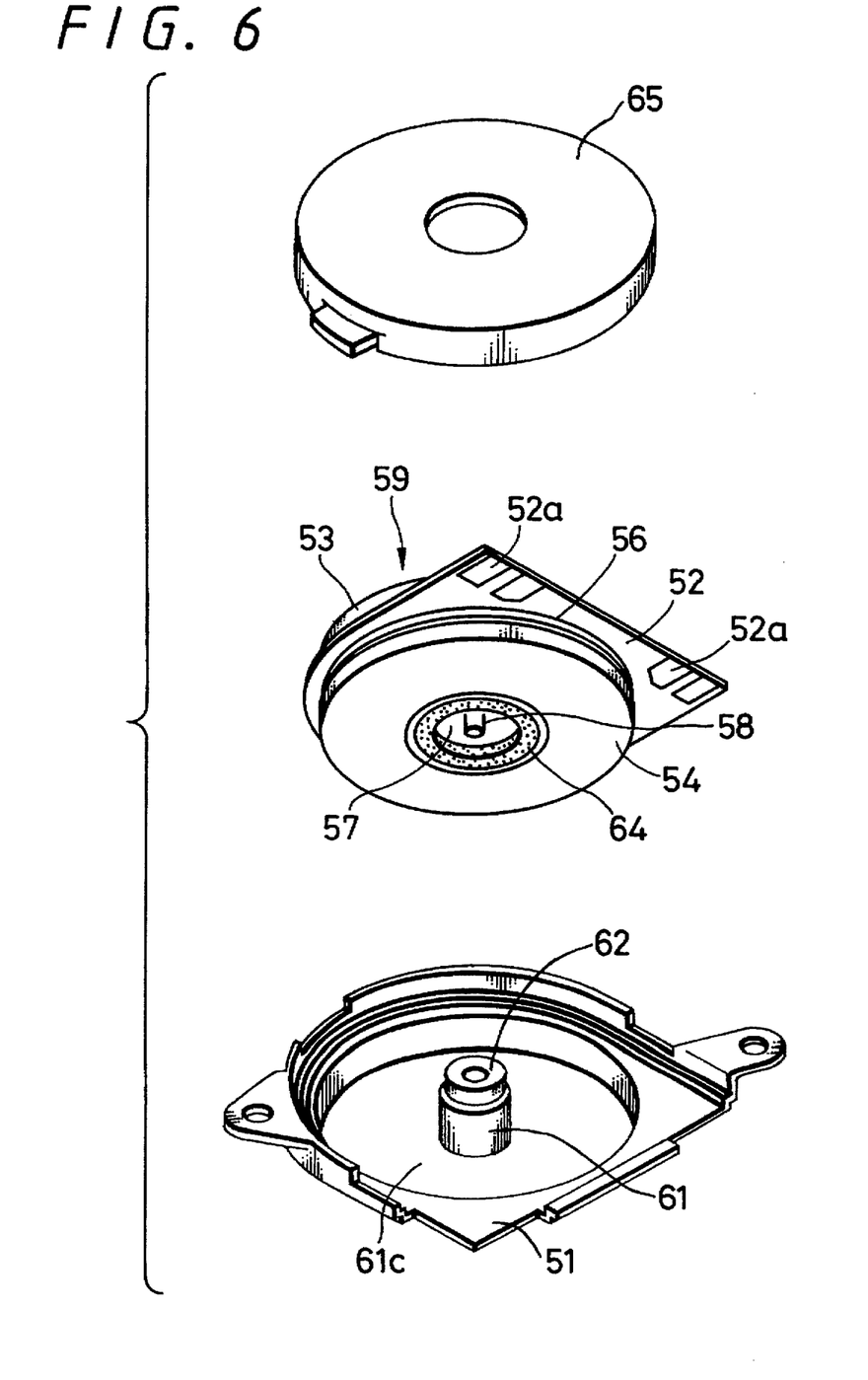
FIG. 6 is an exploded perspective view illustrative of the flat brushless motor according to the third embodiment of the present invention.

A flat brushless motor according to a third embodiment of the present invention will be described below with reference to FIGS. 5 and 6.

The flat brushless motor according to the third embodiment includes a stator and a rotor 59. The stator includes a stator base 52 with a printed coil formed thereon as a stator coil attached to a motor chassis 51. The rotor 59 includes rotor magnets 55, 56 formed on the upper and lower portions of the stator base 52 with predetermined gaps between them and the stator base 52, yokes 53, 54 with the rotor magnets 55, 56 attached thereto and a boss 57 with the yokes 53, 54 attached thereto. As shown in FIG. 5, the boss 57 is fitted into a rotor shaft 58 with a pressure from the upper end 58a of the rotor shaft 58. The boss 57 has on its outer peripheral surface of the upper end formed a groove to allow a pulley 66 to be integrally formed with the upper end thereof. The boss 57 has the yoke 54 of the yokes 53, 54 attached to its lower end. The other yoke 53 is attached to the boss 57 at its portion lower than the pulley 66 integrally formed with the boss 57. In that case, the yokes 53, 54 are attached to the boss 57 in such a manner that the rotor magnets 55, 56 attached to the yokes 53, 54 are spaced apart from the stator base 52 by a uniform gap and that they become parallel to the stator base 52. As shown in FIG. 6, the stator base 52 has terminal portions 52a with patterns formed thereon in order to energize the printed coil formed on the stator base 52.

In the flat brushless motor according to the third embodiment, the bearing supporting mechanism 60 of the rotor 59 is integrally formed with the motor chassis 51. That is, the cylindrical bearing cage 61 for retaining therein the bearing is integrally formed with the motor chassis 51 made of a magnetic metal at its substantially center portion of the bottom surface by deep drawing. When the bearing cage 61 is integrally formed with the motor chassis 51 by deep drawing, the motor chassis 51 has on the lower surface of its bottom portion formed an outer peripheral surface portion surrounding a cylindrical bore 61a defined in the lower end of the bearing cage 61 as a concave surface portion 61b.

The sintered oilless bearing 62 is fitted with a pressure into the bearing cage 61 integrally formed with the bottom surface portion of the motor chassis 51 from the open portion of the upper end of the bearing cage 61 by deep drawing. Also, the thrust pad 63 made of a wear-resisting material such as nylon is fitted into the cylindrical bore 61c defined in the lower end of the bearing cage 61 and thereby is brought in contact with the lower end surface of the sintered oilless bearing 62. In this state, a thrust-restriction plate 63a is fixed to the motor chassis 51 on its concave surface portion of the lower surface by a suitable method such as welding or bonding. The thrust pad 63 is held by the thrust-restriction plate 63a. Thus, the bearing supporting mechanism 69 is formed.

In the third embodiment, an annular attraction magnet 64 is bonded to the lower end of the inner surface of the boss 57 in an opposing relation to the rotor 59 with a predetermined gap between it and the outer peripheral surface of the bearing cage 61. The annular attraction magnet 64 is opposed to a portion 61c that surrounds the bearing cage 61 provided on the inner surface of the bottom of the motor chassis 51 with a predetermined gap.

In the flat brushless motor thus arranged, the boss 57 of the rotor 59 is fitted into the upper end 58a of the rotor shaft 58, the lower end 58b of the rotor shaft 58 is inserted into the sintered oilless bearing 62 of the bearing supporting mechanism 60, and the rotor shaft 58 is supported by the thrust pad 63. In this state, when the attraction magnet 64 is attached to the boss 57 so as to surround the bearing cage 61, the attraction magnet 64 and the bottom surface of the motor chassis 51 are opposed to each other with the predetermined gap so that a magnetic attraction directly acts between the attraction magnet 64 and the bottom surface of the motor chassis 51, thereby the whole of the rotor 59 being biased toward the bottom surface of the motor chassis 51. A peripheral edge portion of the stator base 52 is engaged with the motor chassis 51 at its peripheral edge portion of the upper end side. A motor cover 65 is attached to the motor chassis 51 so as to cover the upper open portion of the motor chassis 51. The flat brushless motor is formed in this way. When the motor cover 65 is attached to the motor chassis 51, the terminal portions 52a of the stator base 52 are projected from the motor housing and the patterns on the terminal portions 52a are electrically connected to feeders or signal lines by soldering, thereby energizing the printed coil formed on the stator base 52.

In the flat brushless motor according to the third embodiment, the bearing cage 61 for retaining therein the sintered oilless bearing 61 with the rotor shaft 58 pivotally supported thereto is integrally formed with the motor chassis 51 by deep drawing. Further, the attraction magnet 64 is fixed to the boss 57 of the rotor 59 to urge a magnetic attraction force to directly act between the attraction magnet 64 and the inner surface of the bottom portion of the motor chassis 51, thereby biasing the whole of the rotor 59 toward the bottom portion of the motor chassis 51. Consequently, as compared with the flat brushless motor wherein the bearing cage is made of a magnetic metal different from that of a motor chassis and the bearing cage is attracted by an attraction magnet fixed to the rotor side, a cost for the bearing cage itself and a machining cost of the bearing cage can be reduced. Moreover, since the bearing cage need not be fixed to the motor chassis by some suitable methods such as caulking, the flat brushless motor according to this embodiment can be produced inexpensively.

Since the bearing cage 61 is integrally formed with the motor chassis 51, the bearing cage 61 can be formed at the correct position with a high accuracy of dimension. Also, since the attraction magnet 64 and the motor chassis 51 are directly magnetically attracted each other, the rotor 59 can be reliably biased toward the bottom portion side of the motor chassis 51. Therefore, the rotor shaft 58 can be pivotally supported in the thrust direction with a high accuracy, whereby the rotor 59 can be rotated stably.

A flat brushless motor according to a fourth embodiment of the present invention will hereinafter be described with reference to FIG. 7. In the fourth embodiment of the present invention, the bearing supporting mechanism, in particular, the bearing cage according to the third embodiment shown in FIGS. 5 and 6 can be improved. A rest of the arrangement is the same as those of FIGS. 5 and 6. Therefore, in FIG. 7, like elements and parts corresponding to those of FIGS. 5 and 6 are marked with the same references and need not be described herein.

Figure 7:
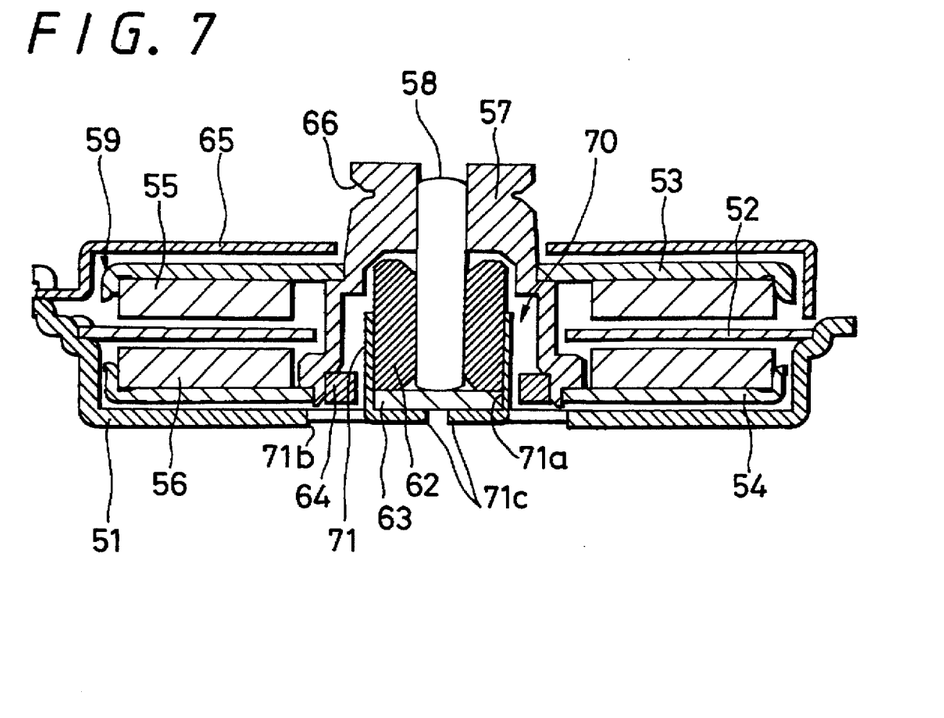
FIG. 7 is a cross-sectional view illustrative of a flat brushless motor according to a fourth embodiment of the present invention.

In the fourth embodiment, as shown in FIG. 7, a bearing supporting mechanism 70 of the rotor 59 is integrally formed with the motor chassis 51. A cylindrical bearing cage 71 is integrally formed with the motor chassis 51 at its substantially center portion of the bottom surface by deep drawing (burring) such that it is projected from the bottom surface of the motor chassis 51. When the bearing cage 71 is integrally formed with the motor chassis 51 by deep drawing, a concave surface portion 71b is formed on the lower surface of the bottom of the motor chassis 51 at its portion surrounding a cylindrical bore 71a defined in the lower end of the bearing cage 71.

On the portion which surrounds the housing portion 71 of the motor chassis 51, i.e., the concave surface portion 71b are formed a plurality of supporting members 71c which can be folded and bent toward the cylindrical bore 71b defined in the lower end of the bearing cage 71 in such a manner that they are radially raised from the peripheral edge of the base and of the bearing cage 71, i.e., peripheral edge of the rising portion of the motor chassis 51. Specifically, a plurality of slip-like supporting members 71c are radially raised on the bottom surface of the motor chassis 51 from the center of the bearing cage 71 and folded and bent toward the inside of the bearing cage 71 so as to close the cylindrical bore 71a defined in the lower end of the bearing cage 71. In this way, as shown in FIG. 7, the supporting members 71c are formed so as to close the cylindrical bore 71a defined in the lower end of the bearing cage 71.

The sintered oilless bearing 62 is fitted with a pressure into the bearing cage 71 integrally formed with the motor chassis 51 from the opening portion of the upper end of the bearing cage 71 by deep drawing (burring). Also, the thrust pad 63 made of a wear-resisting material such as nylon is fitted into the bearing cage 71 from the cylindrical bore 71a defined in the lower end of the bearing cage 71 and thereby brought in contact with the lower end surface of the sintered oilless bearing 62. In this state, the supporting members 71c are folded and bent so as to close the cylindrical bore 71a defined in the lower end of the bearing cage 71, thereby holding the thrust pad 63. Thus, the bearing supporting mechanism 71 is formed.

By the sintered oilless bearing 62 of the bearing supporting mechanism 70, the lower end of the rotor shaft 58 with the boss 57 fixed thereto with a pressure is inserted into the bearing cage 71. As a result, the attraction magnet 64 disposed on the inner surface of the lower side of the boss 57 is disposed at the position with the predetermined gap from the bearing cage 71. A magnetic attraction directly acts between the attraction magnet 64 and the inner surface of the bottom surface of the motor chassis 51, whereby the whole of the rotor 59 is biased in the bottom surface side of the motor chassis 51. The lower end surface of the rotor shaft 58 is pivotally supported by the thrust pad 63. The stator base 52 is held by the peripheral edge portion of the open portion exposed on the upper end side of the motor chassis 51. A motor cover 65 is attached to the open portion exposed on the upper end side of the motor chassis 51 in order to protect the rotor 59 or the like from being damaged.

In the flat brushless motor according to the fourth embodiment, the bearing cage 71 which retains therein the sintered oilless bearing 62 with the rotor shaft 58 pivotally supported thereto is integrally formed with the bottom surface of the motor chassis 51 by deep drawing. Further, the supporting members 71c that hold the thrust pad 63 fitted into the cylindrical bore 71a defined in the lower end of the bearing cage 71 are formed on the motor chassis 51 so as to be folded. Thus, costs for the supporting members of the bearing cage and the thrust pad and machining costs therefor can be reduced. In addition, the bearing cage 71 can be fixed to the motor chassis 51 without caulking and the thrust pad 63 can be held only by folding and bending the supporting members 71c toward to the cylindrical bore 71a of the bearing cage 71 without caulking, thereby the flat brushless motor according to this embodiment being made inexpensive. In the case of the fourth embodiment, the bearing cage 71 is integrally formed with the motor chassis 51, whereby the bearing cage 71 can be formed at the correct position with a high accuracy of dimension. Furthermore, since the attraction magnet 64 and the motor chassis 51 are directly magnetically attracted each other, the rotor 59 can be reliably biased to the bottom side of the motor chassis 51, whereby the rotor shaft 58 can be pivotally supported with a high accuracy in the thrust direction so as to become rotatable stably.

A flat brushless motor according to a fifth embodiment of the present invention will be described below with reference to FIG. 8.

Figure 8:
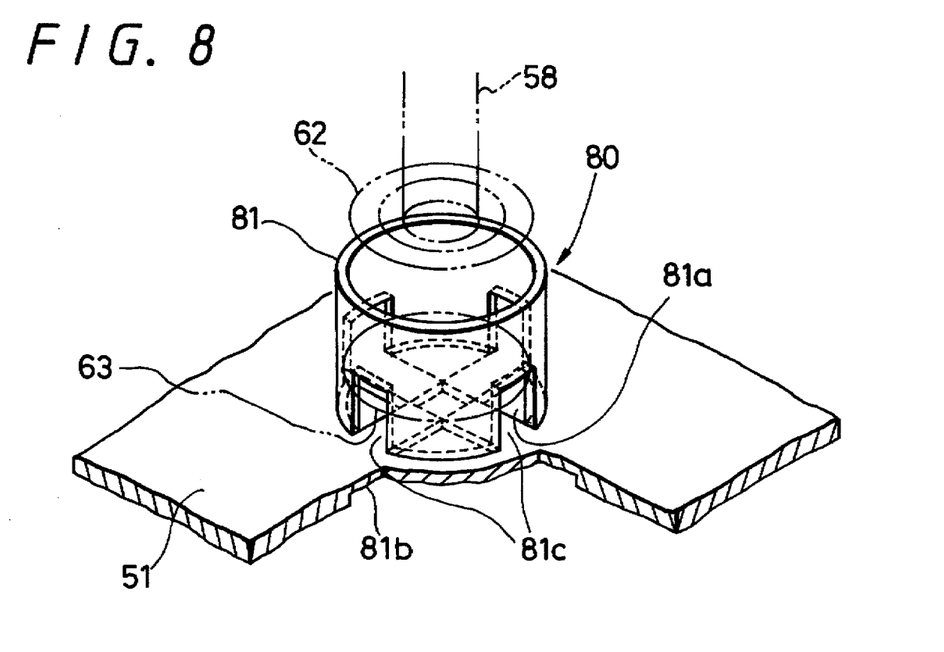
FIG. 8 is a perspective view illustrative of a bearing mechanism of a flat brushless motor according to a fifth embodiment of the present invention.

FIG. 8 shows only a bearing supporting mechanism which is a main portion of the fifth embodiment. A rest of the arrangement of this flat brushless motor is arranged similarly to that of the third or fourth embodiment.

In a bearing supporting mechanism 80 according to the fifth embodiment, a bearing cage 81 which retains therein the sintered oilless bearing 62 is cylindrically integrally formed with the motor chassis 51 by deep drawing similarly to the third and fourth embodiments. A plurality of supporting members 81c that support the thrust pad 63 fitted into a cylindrical bore 81a defined in the lower end of the bearing cage 81 are formed on the circumferential surface of the bearing cage 81 from the base end of the bearing cage 81 with predetermined gaps in the circumferential direction so as to be folded and bent. The supporting members 81c are folded toward the cylindrical bore 81a defined in the lower end of the bearing cage 81, i.e., bent in the direction perpendicular to the axial direction of the bearing cage 81 so as to close the open end of the cylindrical bore 81a. In this state, after the thrust pad 63 has been fitted into the opening portion of the upper end of the bearing cage 81 and supported by the supporting members 81c, the sintered oilless bearing 62 is fitted into the bearing cage 81 with a pressure, thereby the bearing supporting mechanism 81 for pivotally supporting the rotor shaft 58 being arranged. In FIG. 8, reference numeral 81b denotes a thin concave surface portion formed when the bearing cage 81 is integrally formed with the motor chassis 51 by deep drawing.

In the bearing supporting mechanism 80 according to the fifth embodiment, the sintered oilless bearing 62 and the circumferential surface of the thrust pad 63 close the perforations formed through the circumferential surface of the bearing cage 81 after the supporting members 81c for supporting the thrust pad 63 have been folded and bent, thereby preventing the motor chassis 51 from being smudged by dusts or the like.

The shape of the bearing cage is not limited to the cylinder and may be a prism. Further, the shape of supporting member can be varied arbitrarily.

In the flat brushless motors according to the above-mentioned embodiments, while the rotor magnets are opposed to the stator base to generate vertical magnetic flux, the present invention is not limited thereto and the rotor magnet may be opposed to one surface of the stator base, i.e., stator coil surface.

The stator coil of the stator base is not limited to the printed coil and may be a coil formed by winding.

The pulley is not always formed on the boss and a rotor shaft may be extended so as to pivotally support other rotating member.

The present invention is not limited to the flat brushless motor and can be applied to a motor which is thick in the axial direction. Furthermore, the bearing supporting mechanism can pivotally support not only the rotor shaft of the motor but also a shaft of other rotating device.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A motor comprising:
   a bearing for supporting a rotary shaft of a rotor;
   a chassis having a unitary deep drawn bearing cage for retaining said bearing;
   a thrust pad for engaging an end portion of the rotary shaft disposed within the bearing cage; and
   a plurality of supporting members at a bottom portion of the bearing cage for supporting said thrust pad.

2. A motor as claimed in claim 1, wherein the bearing cage is integrally formed with said chassis by effecting deep drawing (burring) on a bottom surface portion of said chassis.

3. A motor as claimed in claim 1, wherein the bearing cage projects from a bottom surface portion of said chassis and is cylindrical.

4. A motor as claimed in claim 1, wherein said supporting members are portions of said chassis located about said bearing cage which are bent to as to projected toward an interior of said bearing cage.

5. A motor as claimed in claim 1, wherein said supporting members are bent portions of a peripheral wall portion of said bearing cage which project toward an interior of said bearing cage.

6. A motor as claimed in claim 1, wherein said bearing portion is force fitted into the bearing cage.

7. A motor as claimed in claim 1, wherein said plurality of supporting members are unitarily integral with said chassis.

8. A motor comprising:
   a rotor having a central boss portion and a shaft coaxial with the boss;
   a sintered bearing having a bore through which the shaft of said rotor extends;
   a chassis having a unitary deep drawn bearing cage for retaining said sintered bearing; and
   an attraction magnet attached to an inner surface of a lower end of the boss portion of said rotor for attracting said rotor toward said chassis.

9. A motor as claimed in claim 8, wherein said magnet is attached to said rotor at a position directly opposite said chassis.

10. A motor as claimed in claim 8, wherein the deep bearing cage is cylindrical.

11. A motor according to claim 8, further comprising a thrust pad disposed within the bearing cage and engageable with the shaft; and a plurality of supporting members at a bottom surface portion of the bearing cage which support said thrust pad and which project inward into an interior portion of the bearing cage.

12. A motor as claimed in claim 8, further comprising:
    a yoke on which a permanent rotor magnet is supported;
    a stator plate which is supported on said chassis, said stator plate including a printed circuit, said stator plate being arranged to extend inwardly toward the boss, to have an inner edge juxtaposed the yoke, and to be exposed to the permanent rotor magnet; and
    wherein said attraction magnet is arranged so as to be inboard of and lower than an inner peripheral edge of said stator plate.

13. A motor comprising:
    a rotor having a coaxial shaft;
    a bearing having a through bore through which the coaxial shaft extends;
    a chassis having a unitary deep drawn bearing cage for retaining said bearing;
    a thrust pad for engaging an end portion of the rotary shaft disposed within the bearing cage;
    a plurality of supporting members at a bottom portion of the bearing cage for supporting said thrust pad;
    a first yoke;
    a second yoke;
    a plurality of permanent rotor magnets supported on said first and second yokes; and
    a stator plate which is supported on said chassis, said stator plate including a printed circuit, said stator plate being arranged to extend between said first and second yokes toward the boss, to have an inner edge juxtaposed the yoke, and to be exposed to the permanent rotor magnet.

14. A motor as claimed in claim 13, further comprising an attraction magnet disposed on the rotor so as to be inboard of and lower than an inner peripheral edge of said stator plate.

* * * * *